(12) United States Patent
Russo (10) Patent No.: US 6,472,831 B1
(45) Date of Patent: Oct. 29, 2002

(54) I.L. TIMER

(76) Inventor: Thomas Louis Russo, 7 Avenue D, Rutland, VT (US) 05701

( * ) Notice: Subject to any disclaimer, the term of this patent is extended or adjusted under 35 U.S.C. 154(b) by 0 days.

(21) Appl. No.: 09/571,370

(22) Filed: May 15, 2000

(51) Int. Cl.$^7$ .............................................. H05B 37/02
(52) U.S. Cl. ......................... 315/360; 315/71; 315/72; 315/297
(58) Field of Search ............................ 315/58, 61, 307, 315/360, 362, 71, 72, 208, 200 R, 209 R, 293, 297

(56) References Cited

U.S. PATENT DOCUMENTS

| | | | | |
|---|---|---|---|---|
| 4,151,426 A | * | 4/1979 | Price | 307/141 |
| 4,171,471 A | * | 10/1979 | Boyles | 200/38 D |
| 4,575,659 A | * | 3/1986 | Pezzolo et al. | 315/159 |
| 4,712,019 A | * | 12/1987 | Nilssen | 307/141 |
| 5,264,761 A | * | 11/1993 | Johnson | 315/291 |

* cited by examiner

Primary Examiner—Haissa Philogene (57) ABSTRACT

A system for an individual bulb timing assembly for providing direct bulb timed on-off sequencing. A timing assembly that is installed directly into an electrical fixture bulb socket, that provides electrical power to an individual timing assembly, allowing each bulb directly controlled by a timing assembly to be preprogrammed, enabling timed sequence events at the bulb for selected electrical lighting fixtures. The timing assembly receives electrical power that has moved through the select fixture, the invention positioned after the power is through the fixture provides for operation independent of the kind and type of power source, delivery line to the fixture, and the kind and type of switching device controlling the select fixture. The system is programmable at the attached controlled bulb for two timed events in a twenty four hour period. Programmed event timing is protected by the timing assembly's onboard energy storage cell. Events can be programmed for seven separate unique continuous twenty four hour periods and can provide a timed sequencing and time light control for all, or a select number of bulbs in a single fixture. The system relates to inline electrical light fixtures, as well as all portable and temporary light fixtures, such as, but not limited to electrical lamps and extension lighting without the need for hard wiring the system.

5 Claims, 6 Drawing Sheets

I.L. TIMER

BACKGROUND OF INVENTION

This invention relates to a light timing system that is portable and removable. Preprogramming light timing has been accomplished through the intervention of devices that control a light fixture at the wall receptacle through a lamp cord. One such design is disclosed for example in U.S. Pat. No. 4,575,659 issued to Pezzolo et al, on Mar. 11, 1986. Light timing has also been accomplished through the invention of devices that control a light fixture at the wall switch device, that either replaces the traditional conventional wall switch or a device that assists the wall switch to provide programming features. One such design is disclosed for example in U.S. Pat. No. 5,264,761 issued to Samuel Johnson, on Nov. 23, 1993.

One of the several disadvantages of the operation of the electrical control assemblies disclosed above is that in Pezzolo assembly designed to work only with fixtures that can be plugged into a wall receptacle. Eliminating the ability of circuit wired wall and ceiling fixtures from benefiting from a timed event sequence. A disadvantage of Johnson switch control device is that fixtures without a wall switch would not benefit from a timed event programming for light fixture control, examples would be considered traditional floor and table lamp fixtures with traditional power supply provided by plug cord wiring into a conventional wall receptacle, and inline circuit wired ceiling and wall fixtures that are operated by a simply pull chain that turn the power on and off at the fixture socket. Both Johnson and Pezzolo assemblies control their attached fixtures as a single unit, regardless of how many bulbs are contained and controlled in that said attached fixture. Whereas the general purpose and principal object of the present invention is to provide still further improvements in the art and technology of lighting fixture bulb control of the type described above. Another object of this invention is to provide a format, where all light fixtures that use screw type bulbs can have preprogrammed timed on/off lighting and can be preprogrammed for a special lighting effect by using the invention timer device attached to the bulb it controls, said device at the bulb attachment site would allow fixtures with multiple bulbs to have separate timed events for each bulb in a single fixture

SUMMARY OF THE INVENTION

It is therefore an object of the invention to provide a light timing, event timing and light effects device that can control a single bulb (invention can accommodate a range of screw type bulb formats, e.g. Incandescent, fluorescent, halogen, etc. referred herein as "bulb") at the fixture bulb position, (i.e. fixture bulb socket). That is, whereas the invention provides timed lighting control at the fixture bulb socket, control is provided after the power has passed through the fixture. That is, the invention positioned after the power is through the fixture provides for operation independent of the kind and type of power source, delivery line to the fixture, such as circuit wired fixtures, (i.e. hard wired ceiling and wall light fixtures) or temporary and movable fixtures such as, but not limited to table and floor lamps, said lamps are provided power through a conventional lamp cord plugged into an electrical wall receptacle as their power delivery line. Wherein, said power delivery lines can support a wide range of switch types, such as but not limited to a conventional wall toggle switch, wall push button switch, ceiling and wall pull chain switch, lamp turn switch, lamp pull chain switch and lamp post switch, to operate the lighting fixture, that is the invention with said at the bulb position will also operate independent of the above mentioned switch types. It is an additional object of the invention to provide a simple device for home or office that will provide an inline in-socket type timing device, said device provides a safe format for preprogrammed timed lighting in an electrical lighting fixtures. That is, said preprogrammed feature of the invention is controlled by an onboard time keeping assembly set like a conventional liquid crystal display watch, with two Timer modes that will turn a light on or off at a predetermined time. That is said time keeping assembly comprised of time circuits, time chip and rechargeable stored energy supply, said assembly is designed to maintain timing programs If power is interrupted to the light fixture, whereas the invention will continue to provide sequenced events when the power is restored without requiring a resetting of time and timer modes. Said time keeping assembly in a power-on electrical fixture extends the onboard stored energy supply by receiving a small continual recharge (i.e. trickle charge), while the fixture is receiving power through the fixture to the invention. Another feature of the invention, is the timed sequence and event programming is powered by its onboard rechargeable power source (i.e. rechargeable lithium battery), when power is interrupted or the timing assembly is not connected to an electrical lighting fixture. Whereas the time keeping assembly controls the power bridge to the bulb, that is the power bridge is opened when the timer preprogrammed 'timeon' is reached the power circuit is completed and the bulb attached to the timing assembly of the invention is lit, when the timer preprogrammed 'timeoff' is reached the power bridge is closed and the power circuit is interrupted to the bulb installed in the invention and the light goes out. The system of the invention was designed to support two timer modes that provide two timed lighting events in the same twenty-four hour period. That is, conventional electrical lighting fixtures supporting one or multiple screw type bulb sockets, will use the invention in one, all, or a select number of bulb sockets in said fixture, to provide independent light timing events at each bulb socket supporting the invention. At is said invention timing operation requires each invention unit to be screwed into a standard electrical light socket, then to have a light bulb it will control screwed into the invention, therefore the invention provides timing control at each bulb in the fixture socket that contains the invention. For a better understanding of the structure of the invention and its function, further explanation is given below with reference to the attached drawings. The invention is not limited, however, to the particular arrangement portrayed in the subject drawing figures. That is, where a cylindrical configuration is preferred, the interior circuit assemblies of the invention need not be limited to cylindrical shape of the timing assembly and may, instead, be configured in a variety of alternate shapes.

BRIEF DESCRIPTION OF THE DRAWINGS

The foregoing objects and other advantages of the present invention will be more fully understood from the following DESCRIPTION OF PREFERRED EMBODIMENTS with a detailed description and reference to the appended drawings, wherein.

DESCRIPTION OF PREFERRED EMBODIMENTS

The invention is therefore directed to an inline in-socket time control assembly to provide time sequencing and time lighting effects for electrical fixtures, that said invention will provide timing control at the bulb socket position in an electrical fixture, and said assembly can control multiple bulbs in a single fixture independently controlled by a novel socket installed timing assembly comprised of a time keeping assembly, a power storage cell, and a programmable event and sequence assembly.

Turning now to a description of the components illustrated in the drawing figures, which is therefore followed by a discussion of how these various components work together in the invention.

Figure 1:
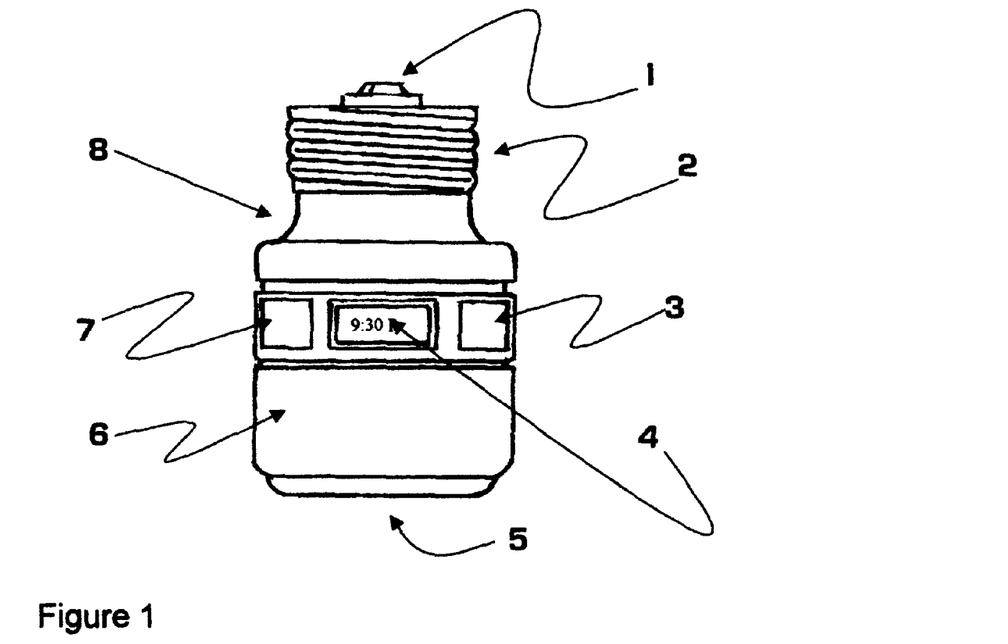
FIG. 1 is a front elevation view of the inline in-socket screw type timing assembly (referred to herein as the "timing assembly"), highlighting socket contact for the hot lead connection of electrical service provided through the fixture (1), Socket screw designed metal fitting, to fit into electrical fixture's bulb socket (2), Right set button that displays time features (3), Liquid Crystal Display screen (4), Opening in unit bottom to receive socket end of light bulb (5), Lower half of timing assembly (6), Left set button to select mode settings (7), Upper half of timing assembly body (8).

FIG. 1 shows the timing assembly unit illustrating the central socket contact (1), for receiving the hot lead of the electrical service brought through the fixture, to said fixture bulb socket containing said timing assembly, shown is a socket screw designed metal fitting (2), said fitting illustrated, to show screw type portion of the timing assembly that provides a screw type fit into said electrical fixture's bulb socket, to conduct neutral electrical current through the fixture to the timing assembly to the bulb controlled by said timing assembly therefore lighting said bulb during the programmed timeon selected time for the duration of the selected timeon period, also illustrating the relative position of the right set button (3), that is, said right set button provides entry connection to program timing assembly features such as; time set, timer1 set, timer2 set, and effects set viewed through liquid crystal display (4), liquid crystal display screen for time and timer settings (4), shown is the entrance opening in the timing assembly (8), to receive socket end of light bulb to be controlled by said timing assembly, shown is the lower half of the timing assembly body (6), containing assembly components such as; power chip, time chip, LCD, programming buttons, lithium battery, socket to receive light bulb, shown is left set button (7), in position left of liquid crystal display (4), to select time and timer settings and select hour of day to provide program time control at the bulb socket position (5), shown is the upper half of timing assembly (8), containing socket connection that places the timing assembly in the electrical fixture bulb socket providing AC power that has moved through the fixture to said timing assembly, wherein said timing assembly control the bulb installed in receiving socket (5).

Figure 2:
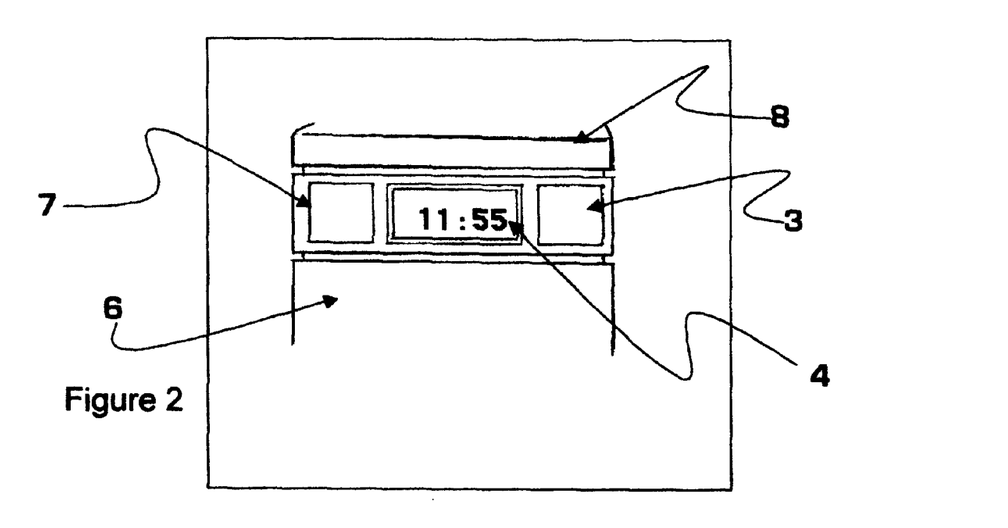
FIG. 2 is a close-up front elevation of the timing assembly, illustrating the relative position of the liquid crystal display and the set button formats, shown in FIG. 1

FIG. 2 provides a close-up view of the timing assembly liquid crystal display screen (4) and the relative position of the right set button (3), that is, said right set button provides entry connection to program timing assembly features such as; time set, timer1 set, timer2 set, and effects set viewed through liquid crystal display (4), and the left set button (7), in position left of liquid crystal display (4), to select time and timer settings and select hour of day to provide program time control at the bulb socket position (5), shown is the upper half of timing assembly (8), containing socket connection that places the timing assembly in the electrical fixture bulb socket, providing AC power that has moved through the fixture to said timing assembly, wherein said timing assembly control the bulb installed in receiving socket (5).

Figures 3, 4:
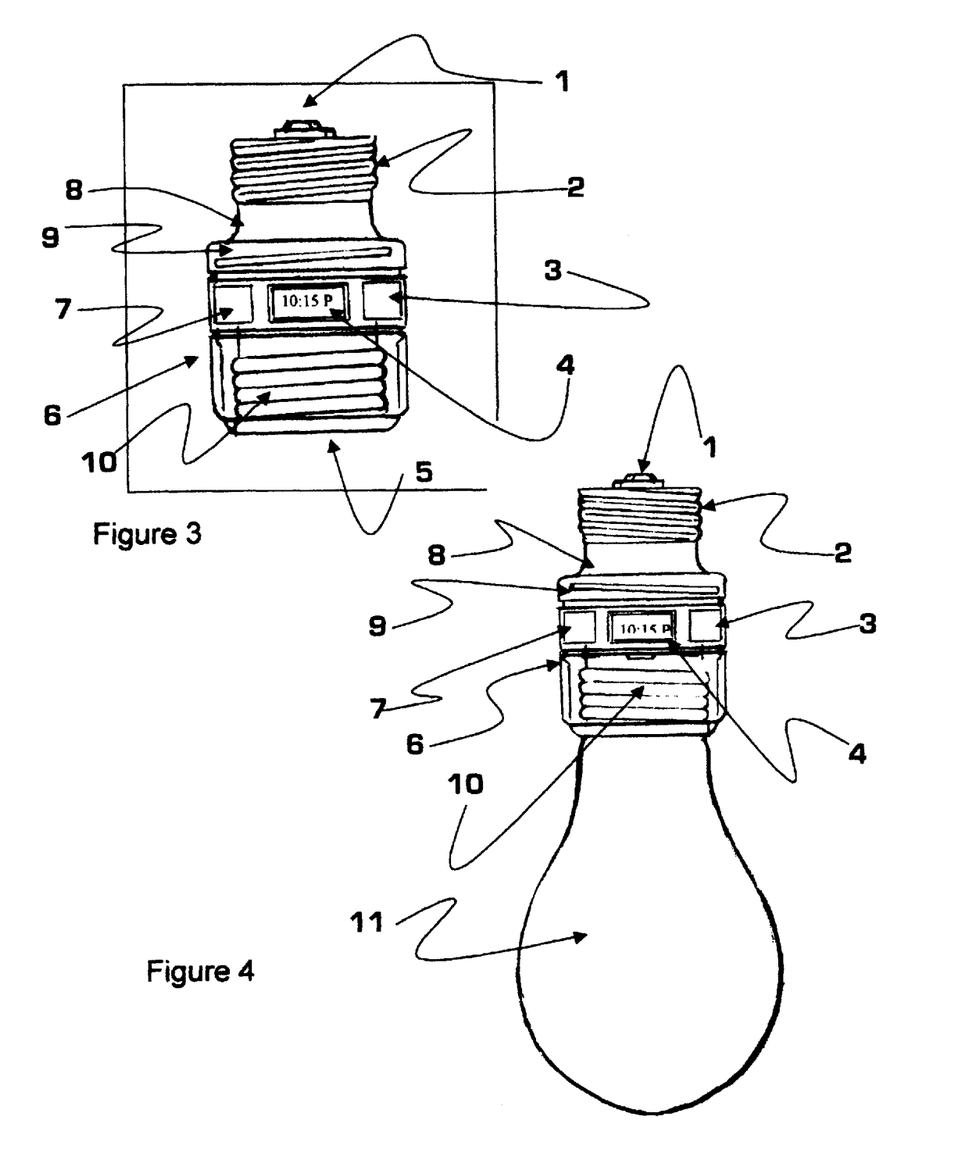
FIG. 3 is a front elevation see-through view of the lower portion of the timing assembly shown in FIG. 1
FIG. 4 is a front elevation see-through view of the lower portion of the timing assembly shown in FIG. 3 with a bulb installed in the proper position in the timing assembly.

FIG. 3 is a see-through view of the timing assembly shown in FIG. 1, highlighting socket contact entrance opening in the timing assembly (5), to receive socket end of light bulb to be controlled by said timing assembly, shown is the screw type connection of upper and lower halves of timing assembly body (9), this screw connection allows entrance into the timing assembly to replace exhausted stored energy cell (i.e. lithium battery), also shown is the metal screw insert (10), that will receive socket end of light bulb the said timing assembly will control.

FIG. 4 is a see-through view of the timing assembly as shown in FIG. 3, illustrating the relative position of the light bulb (11), controlled by said timing assembly in the proper position, shown in the entrance opening in the timing assembly (5), to receive socket end of light bulb (11), to be controlled by said timing assembly, whereas, said receiving metal screw insert (10), that will receive socket end of light bulb the said timing assembly will control power delivery to said bulb (11).

Figures 5, 6:
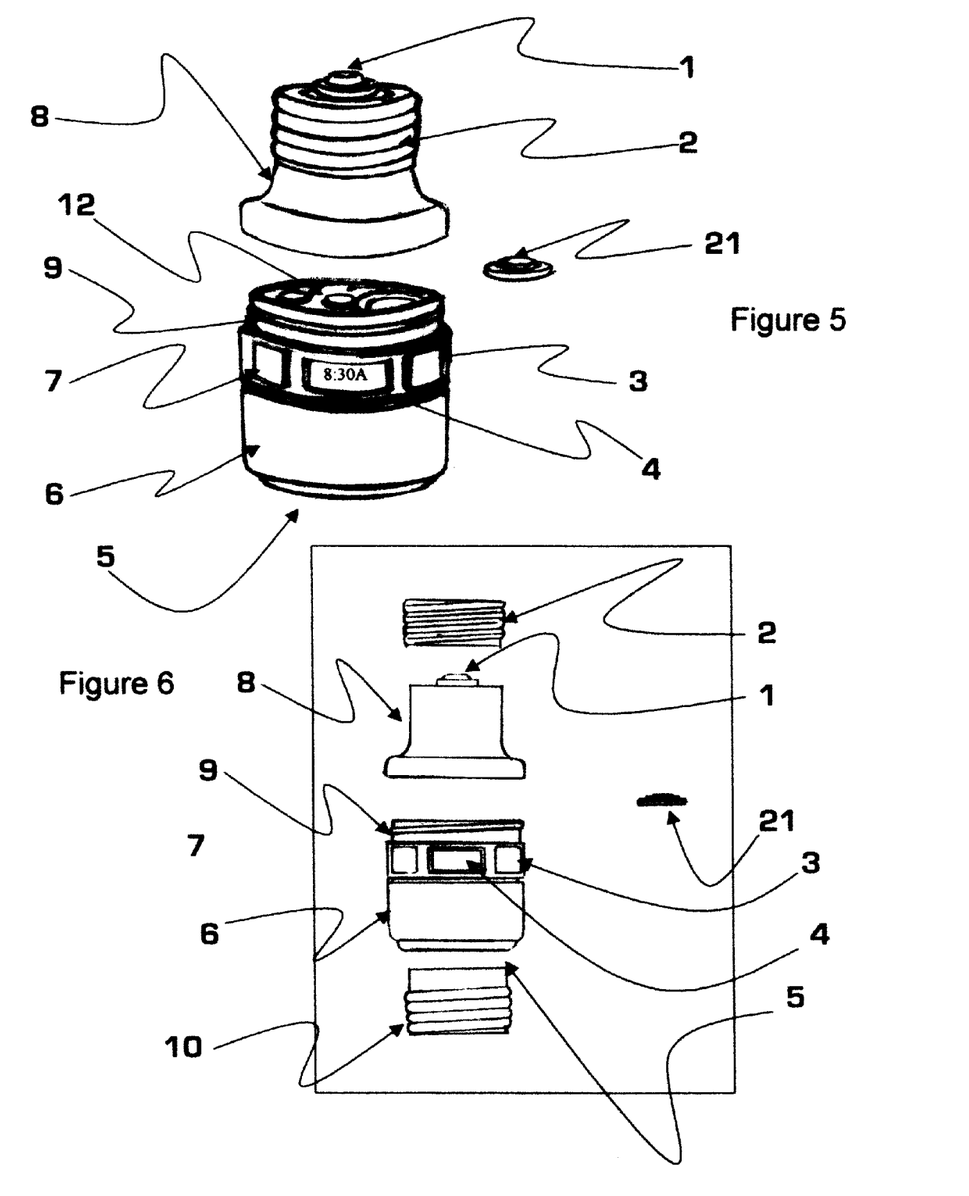
FIG. 5 is a top perspective view of the timing assembly in FIG. 1, with the top portion of the timing assembly open, illustrating relative position of time keeping assembly and power storage unit.
FIG. 6 is an exploded view of the timing assembly sections shown in FIG. 1, illustrating the orientation of the timing assembly main connection sections.

FIG. 5 provides a perspective view of the timing assembly in FIG. 1, in an open position, illustrating the separation of the two main sections, said sections are opened and secured at the screw thread section (9), upper section shown is the upper half of timing assembly (8), containing socket connection that places the timing assembly in the electrical fixture bulb socket, providing AC power that has moved through the fixture to said timing assembly, wherein said timing assembly control the bulb installed in receiving socket (5), shown is the lower half of the timing assembly body (6), containing assembly components such as; power chip, time chip, LCD, programming buttons, lithium battery, socket to receive light bulb (11), shown is left set button (7), in position left of liquid crystal display (4), to select time and timer settings and select hour of day to provide program time control at the bulb socket position (5), also shown is power chip (12) and stored energy cell (i.e. lithium battery) (21).

FIG. 6 illustrates an exploded view of the timing assembly shown in FIG. 1, show are the sections that provide power to said timing assembly, socket contact for hot lead of electrical service (1), Socket screw designed metal fitting, to fit into electrical fixtures bulb socket, to conduct neutral electrical current (2), also shown is the section providing power to the bulb controlled by said timing assembly, shown in the entrance opening in the timing assembly (5), to receive socket end of light bulb FIG. 4(11), to be controlled by said timing assembly, whereas, said receiving metal screw insert (10), that will receive socket end of light bulb the said timing assembly will control power delivery to said bulb FIG. 4(11).

Also show is the position of the right button that displays, time set, timer1 set, timer2 set, effects set and minute display (3), liquid crystal display screen for time and timer settings (4), opening in unit bottom to receive socket end of light bulb (5), Lower half of said timing assembly body, containing, power chip, time chip, LCD, programming buttons, lithium battery, socket to receive light bulb (6), left set button used to select time and timer settings and select hour of day (7), Upper half of timing assembly body, containing socket connection that delivers AC power to said timing assembly (8), screw type connection of upper and lower halves of timer body (9), Metal screw insert to receive socket end of light bulb (10), rechargeable lithium battery (21)

Figure 7:
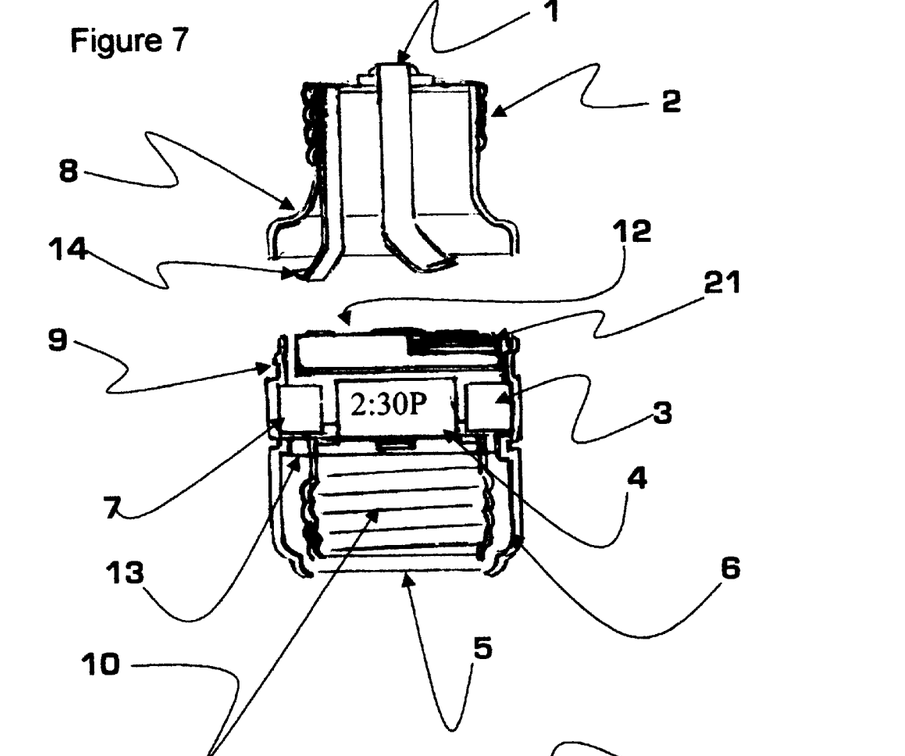
FIG. 7 is a cutaway views of the timing assembly shown in FIG. 1 illustrating the upper and lower sections, highlighting power transfer metal strip hot lead

FIG. 7 shows cutaway views of the upper and lower sections of the timing assembly in FIG. 1, highlighting power transfer metal strip hot lead (15), power transfer metal strip neutral lead (14), timer chip components (13), Also shown is socket contact for hot lead of electrical service (1), Socket screw designed metal fitting, to fit into electrical fixtures bulb socket, to conduct neutral electrical current (2), Right button that displays, time set, timer1 set, timer2 set, effects set and minute display (3), Liquid Crystal Display screen for time and timer settings (4), Opening in unit bottom to receive socket end of light bulb (5), Lower half of said timing assembly body, containing, power chip, time chip, LCD, programming buttons, lithium battery, socket to receive light bulb (6), Left button to select time and timer settings and select hour of day (7), Upper half of timing assembly body , containing socket connection that delivers AC power to timing assembly (8), screw type connection of upper and lower halves of timer body (9), Metal screw insert to receive socket end of light bulb (10), rechargeable lithium battery (21)

Figure 8:
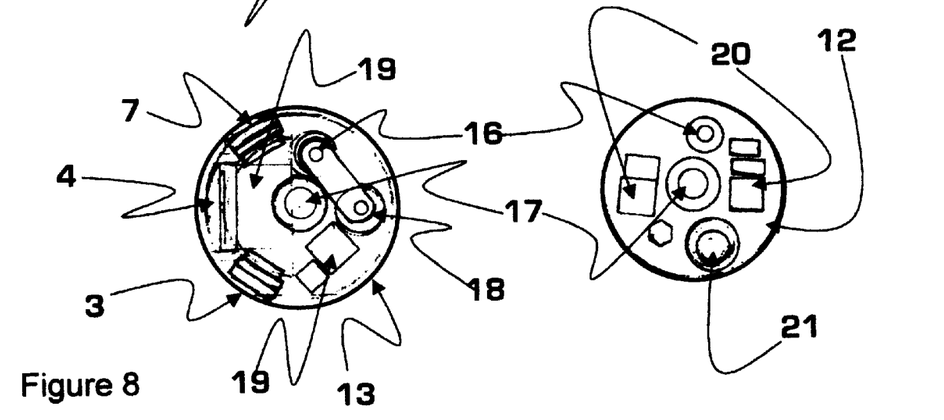
FIG. 8 is a plan view of open timing assembly, lower portion, illustrating relative positions of power and time keeping assemblies.

FIG. 8 plan view of timing assembly components such as; power chip (12) and timer chip sections (13), right set program button (3), liquid crystal display screen for time and timer settings (4), left set program button to select time and timer settings and select hour of day (7), time keeping components (19), power circuit boards and power component transfer (20), stored energy cell (i.e. lithium battery) (21), neutral power contact (16), hot power contact (17) neutral contract power transfer bridge (18).

Figure 9:
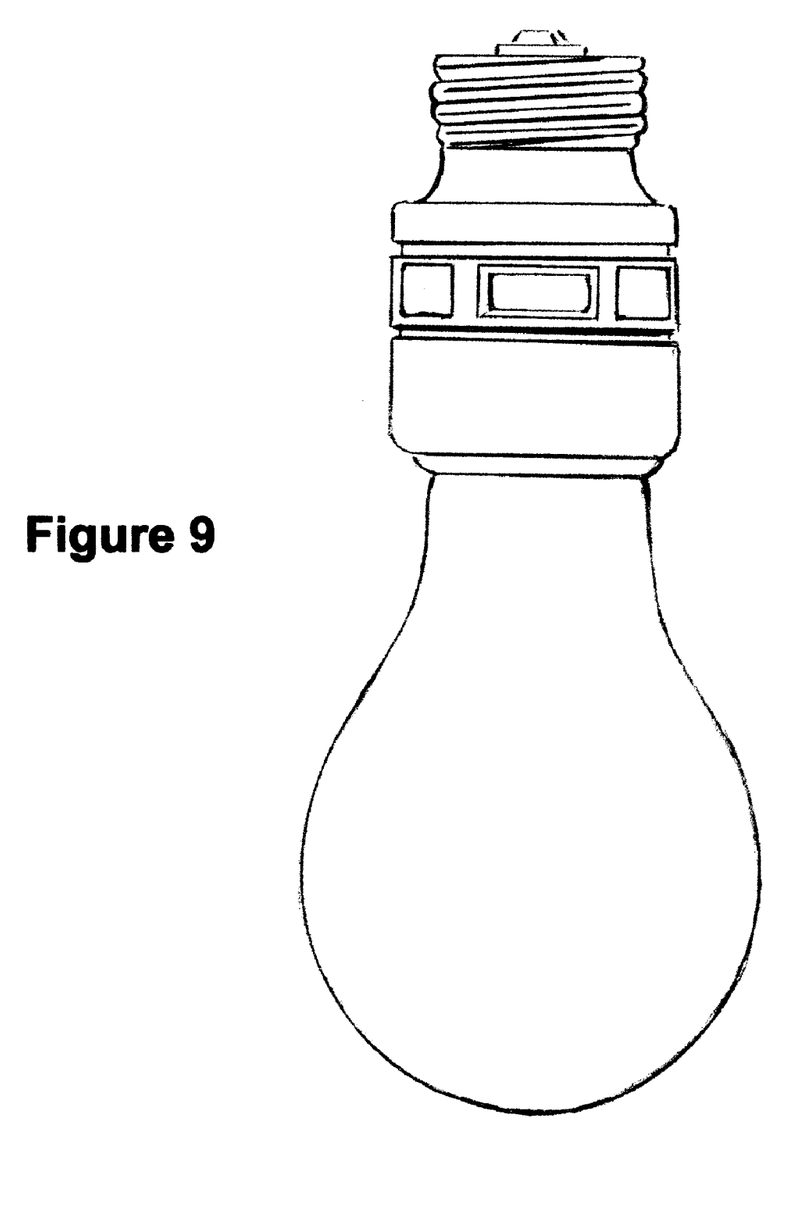
FIG. 9 is a front elevation view of timing assembly shown in FIG. 1, with light bulb, ready to be screwed into any light socket.

FIG. 9 provides a front elevation view of timing assembly shown in FIG. 1, with light bulb in the proper control position, said timing assembly with bulb in control position are ready to be screwed into any socket in an electrical light fixture, providing light on-off control and lighting effects at the bulb position, after the service power moves through said electrical fixture.

Figure 10:
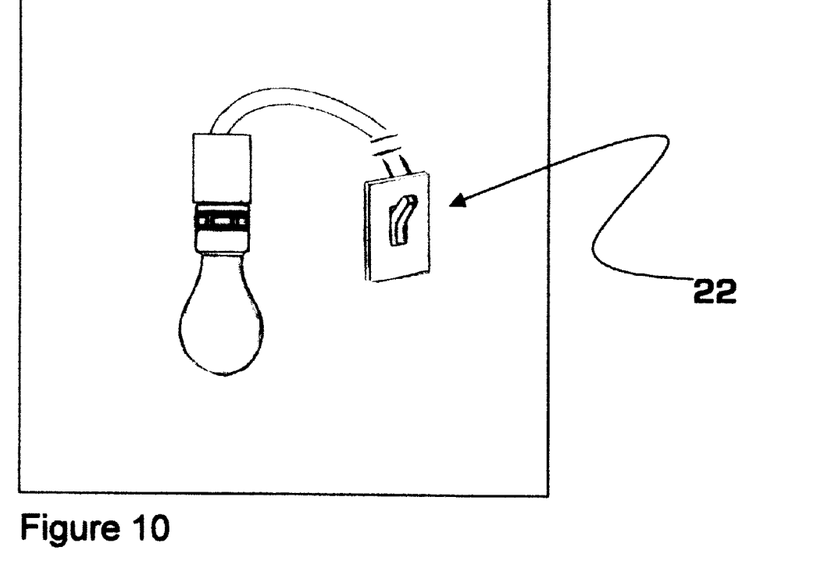
FIG. 10 is a diagram view of timing assembly shown in FIG. 1 illustrating an electrical socket containing the timing assembly shown in FIG. 1 attached inline in-socket to a ceiling or wall permanent fixture controlled by a conventional wall switch.

FIG. 10 is a diagram view of timing assembly shown in FIG. 1 illustrating an electrical socket containing the timing assembly shown in FIG. 1 to illustrate a typical attachment to a in-line circuit to a permanently affixed ceiling or wall fixture controlled by a conventional wall switch (22), whereas control of attached bulb is through said timing assembly receiving power that has been brought through the fixture to the fixture socket contacts.

Figure 11:
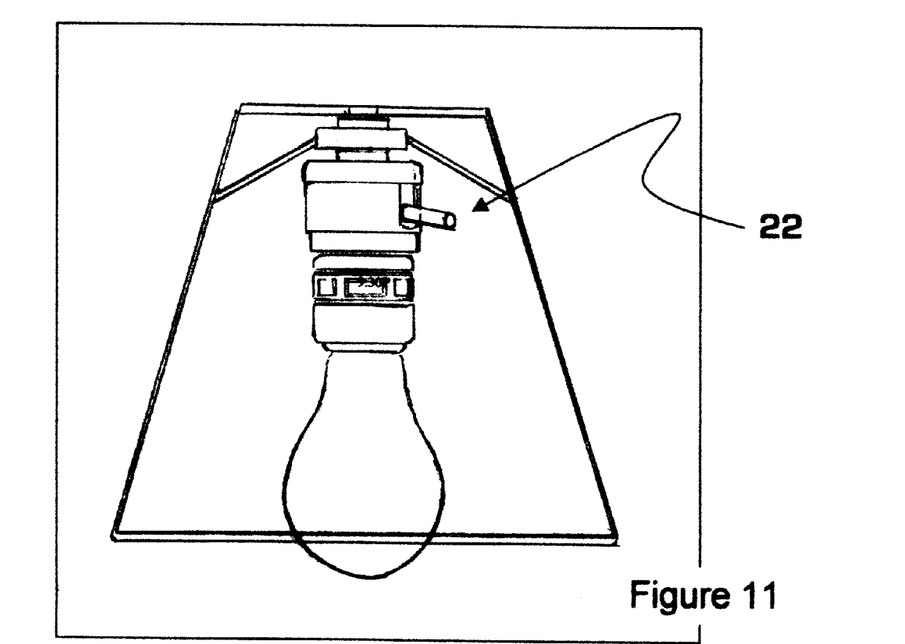
FIG. 11 is a front elevation view of timing assembly shown in FIG. 1, with light bulb in the timing assembly, and said timing assembly installed in a table or floor lamp fixture controlled by a lamp socket post switch.

FIG. 11 is a front elevation view of timing assembly shown in FIG. 1, with light bulb in a table or floor lamp fixture, power is brought through the fixture to the fixture socket contacts and control for lighting the attached bulb in the timing assembly is program controlled by said timing assembly, also show is a lamp socket post type switch (22).

As shown in the accompanying drawing figures, the timing assembly in FIG. 1, of the present invention is everything needed to provide timed lighting to a working electrical light fixture at the said fixture's electrical bulb socket, e.g., as (22) in FIG. 10 and FIG. 11. The timing assembly in FIG. 1, of the invention is thus designed to provide, each bulb controlled by said timing assembly or a single bulb controlled by said timing assembly in an electrical fixture with, programmed timed lighting and lighting effects at the selected socket position. A light bulb controlled by the timing assembly in FIG. 1 e.g., as (11) in FIG. 4, the light bulb would be inserted into the timing assembly bottom opening FIG. 1(5). FIG. 1 and place the bulb contacts in contact with screw thread assembly in FIG. 4(10). Power is moved from the fixture socket to the timing assembly FIG. 4(1) and (2) through the timing assembly FIG. 4(10) and FIG. 8(17), then to the controlled bulb FIG. 4(11). Lighting control through said timing assembly in FIG. 1, provides an initial time set through the following procedure; depress right set button FIG. 2 (3), whereas depressing said button displays program options in liquid crystal display FIG. 2(4), program option SET in liquid display FIG. 2(4), begins program option selection, depressing left set button FIG. 2(7) refines program option selection, SET displayed in the liquid crystal display FIG. 2(4), left set button FIG. 2(7), will refine selection for time keeping unit set for AM and PM time ranges by depressing said button once for AM and twice for PM range identification. That is, depressing the left set button twice when selecting SET and the time set will be PM, press the left set button once when selecting SET and the time set will be AM, said SET mode selected the left set button FIG. 1(7), directs the Hour set and the right set button FIG. 1(3), directs the Minute set, time selection is accomplished by depressing the left set and right set button FIG. (3)(7),simultaneously. Whereas time keeping remains constant and accurate through power supplied from stored energy cell (i.e. lithium battery) and constant supplemental recharge through trickle charge feature, when timing assembly is positioned in electrical fixture bulb socket. That is said timing assembly stored energy cell (i.e. lithium battery) FIG. 5(21), providing constant and accurate time keeping function for an extended period (i.e. up to one year), without any outside power to recharge stored energy cell (i.e. lithium battery), said stored energy cell feature provides for continuous program set support, wherein said stored energy cell FIG. 7(21), receives continuous energy recharge (i.e. trickle charge) through the electrical fixture socket that is supporting said timing assembly (e.g. as in FIG. 10 and FIG. 11), that is, stored energy cell FIG. 6(21) receive continual recharge (i.e. trickle charge), that could extend timing assembly FIG. 1, time keeping function accurate for extended periods (i.e. two or more years), stored energy cell is replaceable by disconnecting the timing assembly from the electrical socket, pressing the side wall of said timing assembly unit body lower half FIG. 5(6), and turning the lower half counter clockwise, once a new stored energy cell (i.e. lithium battery) is installed FIG. 5(21) and FIG. 7(21), repeat time SET sequence described above. Whereas powered time chip FIG. 8(13), provides timing assembly with time keeping function accurate through normal powered operation, described above, whereas said time chip provides accurate time keeping for a time when the timing assembly unit experiences power interruptions. Timing assembly FIG. 1, allows for two timed event sequences in a twenty-four hour period. To set a timer depress the right set button FIG. 1(3) until TIMER1 appears in the display FIG. 1(4), press the left set button FIG. 1(7) to refine time selection, depress right set button until timeon appears in the display, pressing left set button selects timeon repeating this procedure for timeoff selection will complete one timed event range. To select the second timed event in a twenty four hour period (whereas, second timed event is not required), press the right set button FIG. 2(3), until TIMER2 appears in the display FIG. 2(4), and repeat the Timer set sequence described above for TIMER1.

Referencing FIG. 1 timing assembly supports an EFFECT feature, whereas said feature selection through the following procedure; depressing the right set button FIG. 1(3), until EFFECT appears in the liquid crystal display FIG. 2(4), depress the left set button FIG. 1(7) to select EFFECT, depress right set button FIG. 1(3), until NORMAL appears in the display, depress left set button FIG. 1(7), to select NORMAL., whereas said NORMAL setting provides basic, on and off timed operation of the bulb FIG. 4(11), controlled by timing assembly in FIG. 1, everyday that power is provided to the light fixture FIG. 11, FIG. 10 containing timing assembly in one or all fixture sockets the timed lighting feature TIMER1 and TIMER2 control select bulbs at designated time ranges in a twenty four hour period. Wherein, the timing assembly in FIG. 1, provides DAYS feature a selection of one through seven days to provide programmed timed events, that is on and off timed operation of the bulb controlled by the said timing assembly, on select days that power is provided to the light fixture containing said timing assembly, at the TIMER1 and TIMER2 designated time. Depress the right set button FIG. 1(3), until EFFECT appears in the display, depress left set button FIG. 1(7), to select EFFECT, press right set button FIG. 1(3), until DAYS appears in the display, depress left set button FIG. 1(7), to select DAYS, numbers one through seven (1234567) will appear in liquid crystal display FIG. 2(4), depress left set button FIG. 1(7), highlight each day the timed program is required, after each day is highlighted depress right set button FIG. 1(3), to select the day, that is said feature will allow the programmed time event on select days, wherein to cancel said feature select NORMAL and the time event will occur everyday as described above. That is the days feature provides timed events on programmed select days, without this feature selected up to two timed events in a twenty four hour period will be repeated every twenty four hours. In addition to the NORMAL and DAYS effect feature of the timing assembly, said assembly provides a DOT and DASH lighting effect the allows the timed sequence event to blink in a fast DOT sequence or the blink in a slower DASH sequence providing a decorative mode at each bulb controlled by a timing assembly. That is said DOT and DASH effect can be programmed with similar procedure used to select NORMAL on off operation described above. That is a timed operation of the bulb controlled by said timing assembly in FIG. 1, everyday that power is provided to the light fixture FIG. 10, 11, containing said timing assembly at the TIMER1 and TIMER2 designated times under the NORMAL setting or on select days under the DAYS setting.

Wherein said timing assembly FIG. 1, shall be installed in the following procedure; that is to install said timing assembly, after setting time and features as described above, screw an light bulb FIG. 4(11) into the timing assembly opening FIG. 3(5), FIG. 4 shows the timing assembly and controlled bulb complete for installation in an electrical ceiling or wall fixture, in all or a select fixture socket to control select bulb operation, said fixture operated by a wall switch FIG. 10, or in a table or floor lamp powered through a lamp cord controlled at the lamp socket FIG. 11.

Another feature of the present invention is the normal use of the fixture supporting one or many timing assemblies without removing said assemblies, by passing timed events and lighting effects is accomplished by turning the power supply off to said fixture as described below; to shut the timed sequence off and use the light in its usual manner, simply turn the switch FIG. 10(22), 11(22), on and off three consecutive times and the timing assembly will allow the bulb to operate from the switch FIG. 10(22), 11(22), without any timed programming. To restore the programmed timed sequence turn the switch FIG. 10(22), 11(22), on and off two consecutive times and said timing assembly will resume programmed timed sequence events and programmed lighting effects. That is said timing assembly remains in place while the fixture is used without timed lighting, said timing assembly passes the power through to the bulb.

Wherein the timing assembly is in the powered electrical socket FIGS. 10, 11, the hot lead FIG. 7(1), goes directly to the end of the light bulb FIG. 4(11), but the neutral lead FIG. 7(14), is held at the time chip FIG. 8(16), until the programmed time allows the opening of the neutral lead FIG. 8(18), to the light bulb completing the circuit and turning on the light. When the timeoff designated time is reached said time chip FIG. 8(16) closes the bridge to the neutral lead and the circuit is broken shutting off the bulb. Timing assembly provides an in-socket-timing device for electrical lighting fixtures. That is at the bulb control provides control at separate bulbs in a single fixture at provide independent control of each separate bulb, controlled by said timing assembly.

It is to be understood that the present invention is not limited in scope by the exemplified embodiments which are intended as illustrations of single aspects of the invention, and embodiments and methods which are functionally equivalent are within the scope of the invention. Indeed various modifications of the invention in addition to those described herein will become apparent to those skilled in the art from the foregoing description.

What is claimed is:

1. An individual bulb timing system for providing direct bulb timed on-off sequencing, comprised of a rechargeable battery and liquid crystal display timer assembly, herein known as the timer assembly, this assembly installed directly into electrical fixture bulb socket of a standard screw receptacle providing electrical power to said timing assembly controlling a bulb directly screwed into this assembly.

2. The system of claim 1, wherein said timing assembly positioned after the power is through the fixture provides for operation independent of the kind and type of power source, delivery line to the fixture, and the kind and type of switching device controlling the fixture.

3. The system of claim 1, wherein said timing assembly is programmable at the attached controlled bulb for two timed events in a twenty four hour period, wherein said events programmed for seven separate unique continuous twenty four hour periods, or the same two events for all continuous periods.

4. The system of claim 1, wherein said timing assembly programmed for several lighting effects comprised of first a power on-off control, second on-off or intermittent power on-off to support specialty lighting effect up to two times per day for select event and effect programming for seven continuous twenty four hour periods, third effect support specialty lighting with intermittent power on-off sequencing for designated time periods, fourth effect to allow fixture control of the bulb.

5. The system in claim 1, wherein a multiple bulb fixture each bulb controlled by a separate timing assembly will provide a separate timed events sequences and lighting features in a single fixture.

* * * * *